United States Patent
Coulson et al.

(10) Patent No.: US 11,722,021 B2
(45) Date of Patent: Aug. 8, 2023

(54) GENERATOR FOR DRIVING A PREDEFINED LOAD

(71) Applicant: In Motion US, LLC, Blacksburg, VA (US)

(72) Inventors: David M. Coulson, Radford, VA (US); Gerald W. Brown, Radford, VA (US)

(73) Assignee: In Motion US, LLC, Blacksburg, VA (US)

( * ) Notice: Subject to any disclaimer, the term of this patent is extended or adjusted under 35 U.S.C. 154(b) by 278 days.

(21) Appl. No.: 17/090,650

(22) Filed: Nov. 5, 2020

(65) Prior Publication Data
US 2022/0140666 A1    May 5, 2022

(51) Int. Cl.
| | |
|---|---|
| H02K 1/16 | (2006.01) |
| H02K 1/27 | (2022.01) |
| H02K 15/03 | (2006.01) |
| H02K 1/276 | (2022.01) |
| H02K 1/28 | (2006.01) |
| H02K 15/02 | (2006.01) |
| H02K 21/12 | (2006.01) |
| H02K 1/02 | (2006.01) |

(52) U.S. Cl.
CPC ............... *H02K 1/165* (2013.01); *H02K 1/02* (2013.01); *H02K 1/276* (2013.01); *H02K 1/28* (2013.01); *H02K 15/024* (2013.01); *H02K 15/03* (2013.01); *H02K 21/12* (2013.01); *H02K 2213/03* (2013.01)

(58) Field of Classification Search
CPC .......... H02K 1/165; H02K 1/02; H02K 1/276; H02K 1/28; H02K 15/024; H02K 15/03; H02K 21/12; H02K 2213/03; H02K 21/14
See application file for complete search history.

(56) References Cited

U.S. PATENT DOCUMENTS

| | | | | |
|---|---|---|---|---|
| 5,808,392 A | * | 9/1998 | Sakai | .................. H02K 1/2793 310/156.28 |
| 2011/0298310 A1 | | 12/2011 | Ross et al. | |
| 2012/0251806 A1 | | 10/2012 | Jeschke et al. | |

(Continued)

FOREIGN PATENT DOCUMENTS

RU     2637767 C2    12/2017

OTHER PUBLICATIONS

International Search Report issued for International Patent No. PCT/US21/58289, dated Feb. 1, 2022.

(Continued)

*Primary Examiner* — Thomas Truong
(74) *Attorney, Agent, or Firm* — Moore & Van Allen, PLLC; Henry B. Ward, III

(57) ABSTRACT

Embodiments of the present invention are directed to a generator for connecting to a predefined load, where the generator is designed and constructed to meet one or more requirements of the predefined load. In specific embodiments the one or more requirements include providing a minimum output voltage while starting the predefined load at or above ambient temperature and providing an output voltage that does not exceed an upper voltage limit while being driven at full speed without any load current at or below ambient temperatures, while maintaining high efficiency under a specified full load running condition and keeping the overall cost and size of the generator low.

26 Claims, 9 Drawing Sheets

(56) References Cited

U.S. PATENT DOCUMENTS

| | | | | |
|---|---|---|---|---|
| 2015/0171674 A1* | 6/2015 | Lee | ......................... | H02P 25/22 |
| | | | | 310/46 |
| 2016/0185187 A1* | 6/2016 | Steele | ..................... | F25B 27/00 |
| | | | | 62/243 |
| 2018/0287436 A1* | 10/2018 | Xu | ......................... | H02K 1/146 |
| 2019/0207460 A1 | 7/2019 | Iwaki et al. | | |
| 2020/0047586 A1* | 2/2020 | Gonze | ................ | B60H 1/00278 |
| 2020/0204029 A1 | 6/2020 | Ishikawa et al. | | |
| 2020/0366222 A1* | 11/2020 | Shimbo | .................... | H02P 6/10 |

OTHER PUBLICATIONS

Written Opinion issued for International Patent No. PCT/US21/58289, dated Feb. 1, 2022.

\* cited by examiner

```
┌─────────────────────────────────────────────────────────────────────┐
│  PROVIDING A STATOR COMPRISING AT LEAST A STATOR CORE WITH A PLURALITY OF │
│  STATOR SLOTS AND A PLURALITY OF STATOR COILS, WHEREIN THE STATOR CORE    │
│         COMPRISES A STATOR LAMINATION STACK MADE OF STEEL                 │
│                                 910                                        │
└─────────────────────────────────────────────────────────────────────┘
                                    │
                                    ▼
┌─────────────────────────────────────────────────────────────────────┐
│   PROVIDING A ROTOR COMPRISING A PLURALITY OF PERMANENT MAGNETS FOR    │
│     ESTABLISHING A ROTATING MAGNETIC FIELD WITHIN THE GENERATOR         │
│                                 920                                      │
└─────────────────────────────────────────────────────────────────────┘
```

FIG. 9

GENERATOR FOR DRIVING A PREDEFINED LOAD

FIELD OF THE INVENTION

The present invention relates to a generator for connecting to a predefined load, where the predefined load has at least one or more voltage requirements.

BACKGROUND

Generators convert motive power into electrical power for serving different types of loads. Characteristics of loads and types of loads to be served by the generators define the size, configuration, complexity, and cost of the generators. Although a lot of generators exist, different types of loads need new generators that meet specific requirements of loads (e.g., voltage requirements, power requirements, size requirements, or the like). Thus, there exists a need for a generator that meets specific requirements of a predefined load described herein.

SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A generator for connecting to a load defines first embodiments of the invention. The generator includes (i) a stator comprising at least a plurality of stator coils and a stator core with a plurality of stator slots, wherein the stator core comprises a stator lamination stack made of steel, and (ii) a rotor comprising a rotor core with a rotor lamination stack made of the steel and a plurality of permanent magnets for establishing a rotating magnetic field within the generator. The generator is structured to: (i) meet a hot generator, high current, transient loaded minimum voltage working point requirement by maintaining relative apparent permeability of the steel below a first limit, and (ii) meet a cold generator, no load current working point maximum voltage limit requirement.

In specific embodiments the generator is structured to meet the cold generator, no load current working point maximum voltage limit requirement by maintaining the relative apparent permeability above a second limit.

In other specific embodiments of the generator, the first limit is 500 and the second limit is 10.

In further specific embodiments of the generator, the output voltage of the generator is dependent on, at least in part, the relative apparent permeability of the steel. In such embodiments, the relative apparent permeability of the steel at the hot generator, high current, transient loaded minimum voltage working point requirement and the cold generator, no load current working point maximum voltage point limit requirement is dependent on one or more of (i) a grade type of the steel (ii) magnetic polarization of the plurality of magnets, (iii) temperature of the generator, (iv) current drawn by the load, (v) size of the generator, (vi) number of series turns per phase of the generator, and (vii) inductance of the generator.

In one specific embodiment of the generator, the plurality of stator slots is 36 and the plurality of permanent magnets are 4. In another specific embodiment of the generator, an outside diameter of the stator is between 253 mm and 342 mm. In another specific embodiment of the generator, a length of the stator lamination stack of the stator is between 145 mm and 196 mm.

In further specific embodiments of the generator, the generator is connected to an induction motor load that drives a refrigeration unit to maintain a temperature at or below 6 degree Celsius.

In further embodiments the present invention is directed to a generator for connecting to a predefined load. The generator includes a generator magnetic circuit including at least in part a steel that is preselected. The generator is structured to (i) meet a hot generator, high current, transient loaded, minimum voltage point requirement by maintaining relative apparent permeability of the steel below a first limit, and (ii) meet a cold generator, no load current, working point maximum voltage limit requirement. In an embodiment, the first limit is 500. In a related embodiment, the generator is structured to meet the cold generator, no load current, working point maximum voltage limit requirement by maintaining the relative apparent permeability above a second limit. In an embodiment, the second limit is 10.

In related embodiments, the generator magnetic circuit further includes a stator having at least a plurality of stator coils and a stator core with a plurality of stator slots, wherein the stator core comprises a stator lamination stack made of steel. In a specific embodiment of the generator, the outside diameter of the stator is between 253 mm and 342 mm. In other specific embodiments of the generator, the length of stator lamination stack is between 145 mm and 196 mm and/or the plurality of stator slots is 36.

In still further embodiments, the generator magnetic circuit further includes a rotor including a rotor core with a rotor lamination stack made of steel and a plurality of permanent magnets for establishing a rotating magnetic field within the generator, in which, the core of the rotor is made of the steel. In a specific embodiment of the generator, the plurality of permanent magnets is 4.

In further specific embodiments of the generator, the output voltage of the generator is dependent on, at least in part, the relative apparent permeability of the steel. In such embodiments, the relative apparent permeability of the steel is dependent on one or more of (i) a grade type of the steel (ii) magnetic polarization of the plurality of magnets, (iii) temperature of the generator, and (iv) current drawn by the load, (v) size of the generator, (vi) number of series turns of the generator and (vi) inductance of the generator.

A permanent magnet generator for a preselected load defines other embodiments of the invention. The permanent magnet generator includes a generator magnetic circuit. The generator magnetic circuit comprises, at least in part, a steel that is preselected. The permanent magnet generator is structured to: (i) meet a hot generator, high current, transient loaded, minimum voltage point requirement by maintaining relative apparent permeability of the steel below a first limit, and (ii) meet a cold generator, no load current, working point maximum voltage limit requirement.

A method for constructing a generator for connecting to a load defines further embodiments of the invention. The method includes (i) providing a stator comprising at least a plurality of stator coils and a stator core with a plurality of stator slots, wherein the stator core comprises a stator lamination stack made of steel, (ii) providing a rotor comprising a rotor core with a rotor lamination stack made of steel and a plurality of permanent magnets for establishing a rotating magnetic field within the generator. The generator is structured to: (i) meet a hot generator, high current, transient loaded, minimum voltage point requirement and by maintaining relative apparent permeability of the steel below a first limit, and (ii) meet a cold generator, no load current, working point maximum voltage limit requirement.

In specific embodiments of the method, the generator is structured to meet the cold generator, no load current, working point maximum voltage limit requirement by maintaining the relative apparent permeability above a second limit. In a specific embodiment, the second limit is 10.

In other specific embodiments the method further includes (i) selecting a grade type of the steel, with a saturation flux density for the stator lamination stack of the stator to meet voltage requirements of the load, (ii) selecting a number of the plurality of stator slots to meet the voltage requirements of the load, (iii) selecting an outside diameter of stator lamination to meet the voltage requirements of the load, (iv) selecting a length of the stator lamination stack to meet the voltage requirements of the load, (v) selecting a number of the plurality of permanent magnets for placing within the rotor to meet a frequency requirement of the load, (vi) selecting magnetic polarization for the plurality of permanent magnets to provide the rotating magnetic field within the generator to meet a voltage requirement of the load, (vii) selecting number of series turns per phase, (viii) selecting size of the generator, and (ix) selecting an inductance of the generator. Additionally, one or more of (i) the saturation flux density of the grade type of the steel, (ii) the number of the plurality of slots, (iii) the outside diameter of the stator lamination, (iv) the length of the stator lamination stack, (v) the magnetic polarization of the permanent magnets, (vi) temperature of the generator, (vii) current drawn by the load, (viii) the size of the generator, (ix) the number of series turns per phase of the generator, and (x) the inductance of the generator, regulate the output of the generator.

In specific embodiments of the method, the number of the plurality of slots is 36. While in other specific embodiments, the number of the permanent magnets is 4. In one specific embodiment of the method, the outside diameter of the stator is between 253 mm and 342 mm and/or the length of the stator lamination stack is between 145 mm and 196 mm. In yet another specific embodiment of the method, the first limit is 500 and the second limit is 10. In a further embodiment of the method, the load is an induction motor that drives a refrigeration unit to maintain a temperature at or below 6 degree Celsius.

BRIEF DESCRIPTION OF THE DRAWINGS

The foregoing and other advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein:

FIG. 9 illustrates a process flow of constructing the generator of FIG. 1, according to embodiments of the present invention.

DETAILED DESCRIPTION OF AN EMBODIMENT OF THE INVENTION

The present invention now will be described more fully hereinafter with reference to the accompanying drawings, in which some, but not all embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Generators have many applications and are designed to meet requirements of different types of load as explained above. Loads connected to generators may be linear loads and/or non-linear loads. Examples of linear loads may include, but are not limited to, heaters, motors, transformers, or the like. Examples of non-linear loads may include, but are not limited to computer, Uninterruptable Power Supplies (UPSs), electronic equipment, variable frequency drives, or the like. Each of these loads may have different requirements and therefore generators used for each of these applications differ in configuration, size, and/or operation.

One application addressed in the present invention is to construct a generator that ultimately drives a stand-alone refrigeration unit or a refrigeration unit located in a truck, tractor, trailer, semi-trailer, or the like used to transport medical supplies, pharmaceutical products (e.g., medicines), perishable products (e.g., meat, dairy, poultry, seafood, or the like), chemical products, or the like. Such an application requires a generator that meets specific voltage, size, efficiency, and/or cost requirements in order to maintain a temperature at or below 6 degrees Celsius within the truck, trailer, semi-trailer, or the like. In particular, a generator used in such an application requires (i) a minimum voltage while starting an inductive load (e.g., induction motor) at or above ambient temperature, and (ii) an output voltage that does not exceed an upper voltage limit while being driven at full speed without any load current at or below ambient temperatures, while maintaining high efficiency under a specified full load running condition and keeping the overall cost and size of the generator low.

Conventional generators existing in such applications are designed using thicker and stronger magnets and/or high number of slots, thereby driving up the size and cost of the generators. Bulky generators that cost more are usually not desirable. As such, there exists a need for a generator that meets specific requirements of the predefined load (i.e., an induction motor that drives the refrigeration unit). The present invention discloses a novel generator that is structured to meet the specific voltage requirements while keeping the size and cost of the generator low and efficiency of the generator high.

Figure 1:
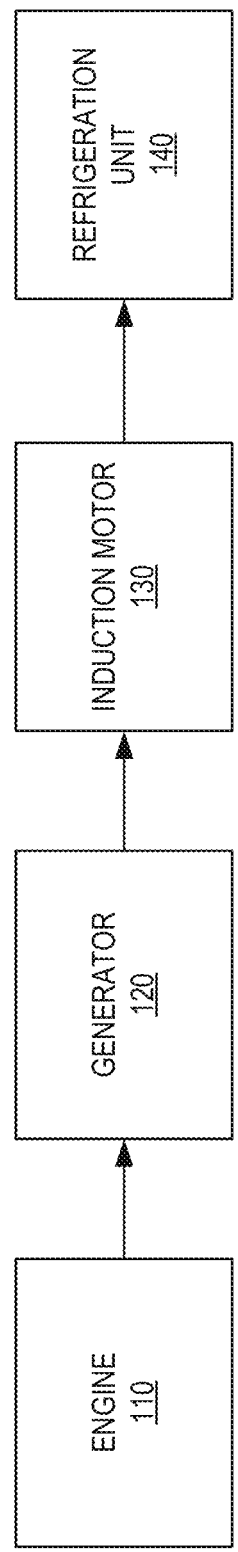
FIG. 1 illustrates a block diagram presenting a generator that is structured to connect to a predefined load, according to embodiments of the present invention.

FIG. 1 illustrates a block diagram 100 of a generator of the present invention that is designed and structured to meet requirements of a predefined load. As shown, generator 120 of the present invention is connected to a predefined load, where the predefined load is an induction motor 130 which is used to drive a refrigeration unit 140. The generator 120 is driven by an engine 110 that controls the speed of the engine generator set to provide a frequency required by the predefined load. In one preferred embodiment of the present invention, the engine 110 is a diesel engine. The generator 120 is designed and structured to meet the requirements of a predefined load by relying at least in part on magnetic characteristics of steel that is used in the generator without having to use stronger and/or thicker magnets that are cost prohibitive.

Figure 2:
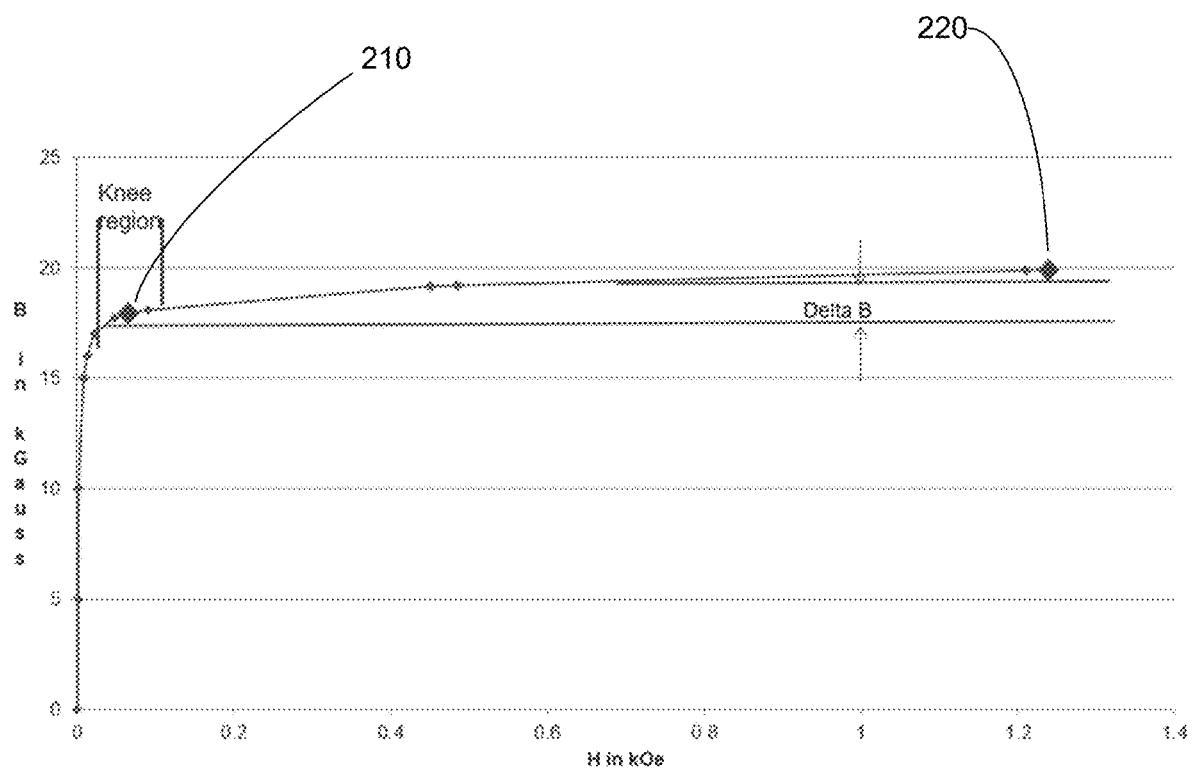
FIG. 2 illustrates a B-H curve associated with steel to be used in the generator to meet requirements of the load, according to embodiments of the present invention.

FIG. 2 illustrates a B-H curve associated with steel to be used in the generator to meet requirements of the load, according to embodiments of the present invention. In some embodiments, to maintain the output voltage of the generator above a transient required voltage while starting the predefined load when at or above ambient temperature and to maintain the output voltage of the generator below an voltage upper limit when running with no load current at or below ambient temperatures, a grade type of steel is selected to construct the generator 120 such that the steel has (i) an apparent relative permeability below 500 for point 210 of FIG. 2 and/or (ii) an apparent relative permeability above 10 for point 220 of FIG. 2. Relative apparent permeability is defined as the ratio of flux density (B) to the applied magnetic field strength (H). As shown, the region of delta B (ΔB) is defined as the difference between a minimum flux density ($B_{min}$) (i.e., point 210 of FIG. 2) of the steel required to meet the transient voltage requirement while starting the predefined load when at or above ambient temperature and a maximum flux density Point ($B_{max}$) (i.e., point 220 of FIG. 2) of the steel required to stay within the maximum output voltage of the generator when running with no load current at or below ambient temperatures.

As shown in FIG. 2, a knee region of the B-H curve is a portion of the curve where the relative apparent permeability starts to rapidly change out of saturation with decreasing flux density (B). In the region of the B-H curve that is above the knee region, the steel used in the generator is in a high degree of saturation. If the flux density (B) of the steel is at point 220 ($B_{max}$) when the generator is running with no load at or below ambient temperatures, then while starting the predefined load, current is drawn by the predefined load, thereby potentially causing the point 210 ($B_{min}$) to drop below the knee region of the B-H curve and the generated voltage may drop below the limit required to start the induction motor, which is not desirable. Therefore, it is important for $B_{min}$ to stay as high on the B-H curve as possible while still having the $B_{max}$ not to cause a voltage to exceed the maximum voltage limit of the generator. In other words, the region of delta B (ΔB) should be minimized, which is possible when the $B_{min}$ is high on the knee region of the B-H curve, that is below a relative apparent permeability limit. The highly saturated condition of the steel minimizes the change in flux density (B) between the hot generator, transient loaded condition and the cold generator no load current condition, thereby keeping the generator within the specified voltage limits. In some embodiments, a grade type of steel is selected such that the relative apparent permeability of the steel is below 500 and above 10 to meet the voltage requirements of the predefined load.

Figure 3A:
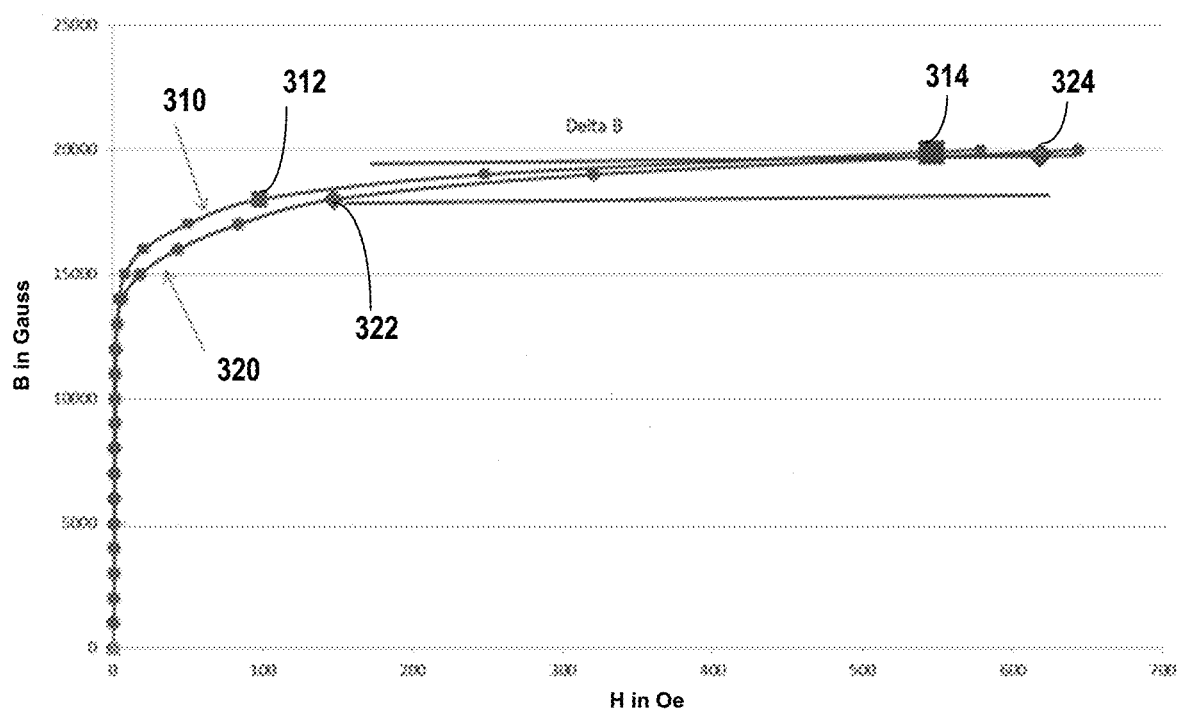
FIGS. 3A-3B illustrate B-H and relative apparent permeability curves of different grades of steel, according to embodiments of the present invention.

FIG. 3A illustrates B-H curves of different grades of steel, according to an embodiment of the present invention. As shown, the curve 310 illustrates the B-H curve for M470-50A grade electrical steel and the curve 320 illustrates the B-H curve for M210-35A grade electrical steel. As shown, the $B_{max}$ (i.e., point 314 associated with curve 310 and point 324 associated with curve 320) and $B_{min}$ (i.e., point 312 associated with curve 310 and point 322 associated with curve 320) value for both the curves 310 and 320 is the same. Therefore, both grade steels have the same delta B (ΔB) such that both grade steels will meet the voltage requirements of the predefined load. However, the magnetic field strength (H) required to achieve the $B_{min}$ and $B_{max}$ values in M210-35A grade electrical steel is higher than the M470-50A grade electrical steel. If the M210-35A grade electrical steel is selected for designing and constructing the generator, a higher grade magnet or a longer magnet in the direction of magnetization with higher field strength is required, thereby driving up the cost of the generator.

Figure 3B:
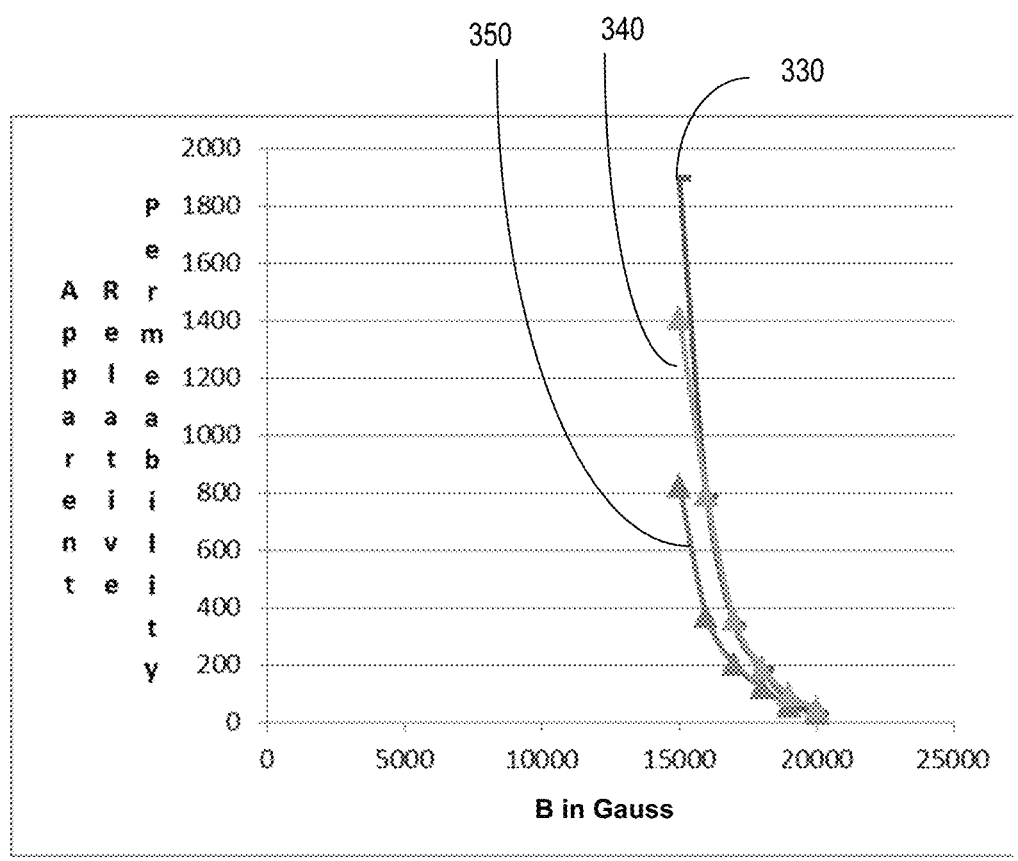

FIG. 3B illustrates relative apparent permeability curves of different grades of steel, according to an embodiment of the present invention. As shown, curve 330 is the relative apparent permeability curve for M470-50A grade electrical steel, curve 340 is the relative apparent permeability curve for M1000-65A grade electrical steel, and curve 350 is the relative apparent permeability curve for M210-35A grade electrical steel. For a given magnetic polarization, the relative apparent permeability curves of different grades of steel shown in FIG. 3B meet the flux density requirements of the predefined load described in FIG. 2. As mentioned above, any of the different grades of steel shown in FIG. 3B may be used in the generator 120. Typically, higher grade electrical steels cost more and have lower losses when compared with lower grade electrical steels that cost less. The M210-35A grade electrical steel is a higher grade steel when compared with the M470-50A grade electrical steel and the M1000-65A grade electrical steel. As explained in FIG. 3A, the amount of field strength (H) required for the M210-35A grade electrical steel is higher than the M470-50A grade electrical steel to achieve the required $B_{max}$ and $B_{min}$ values. Although a higher grade steel is desirable because of lower losses, the cost of the higher grade steel and the additional magnet volume required by the higher grade steel can be prohibitive. The overall cost of the generator is balanced based on selection criteria explained in FIGS. 3A and 3B. In one preferred embodiment, M470-50A grade electrical steel is used in the generator 120 of the present invention to meet the cost requirements and the voltage requirements of the predefined load.

Figure 4:
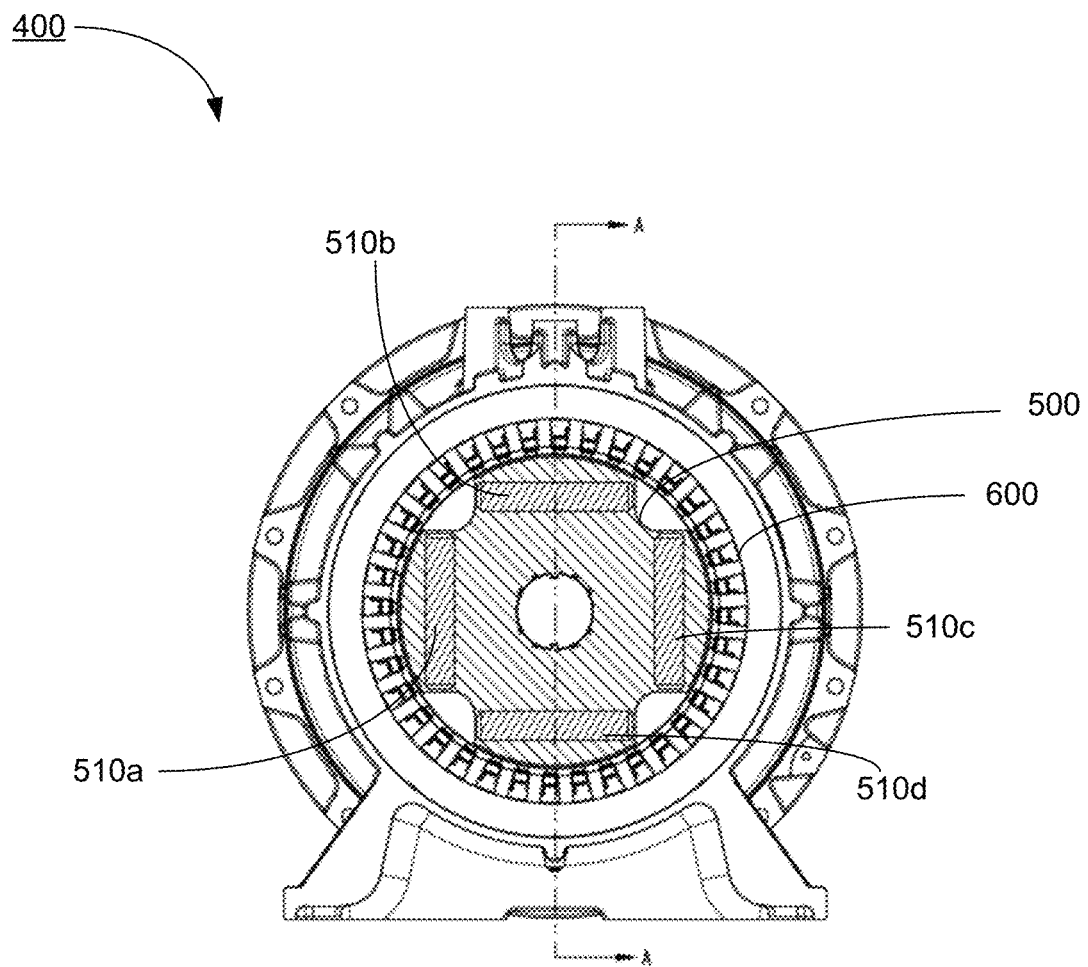
FIG. 4 illustrates a cross sectional view of the generator, according to a embodiments of the present invention.

FIG. 4 illustrates a cross sectional view of the generator 120, according to an embodiment of the present invention. In some embodiments, the generator 120 is a three-phase generator. The generator 120 that is designed and constructed to meet the predefined load requirements, comprises at least a rotor assembly 500 and a stator 600. In some embodiments of the present invention, the generator 120 is a permanent magnet generator, where the generator 120 comprise one or more permanent magnets. The generator 120 may be an 'n' pole generator, where 'n' presents the number of poles. The number of poles 'n' are selected based on the frequency requirements of the predefined load and/or the speed of the rotor 500.

In a preferred embodiment of the present invention, the permanent magnet generator 120 is a four-pole generator comprising four sets of permanent magnets 510a, 510b, 510c, and 510d that are placed inside the rotor assembly 500. In some embodiments, the sets of permanent magnets 510a, 510b, 510c, and 510d may be rare earth magnets. The sets of permanent magnets 510a, 510b, 510c, and 510d may be pre-magnetized magnets that create persistent magnetic field with a predefined magnetic field intensity within the generator. The sets of permanent magnets 510a, 510b, 510c, and 510d are selected in conjunction with the grade type of steel selected for the generator.

Figure 5A:
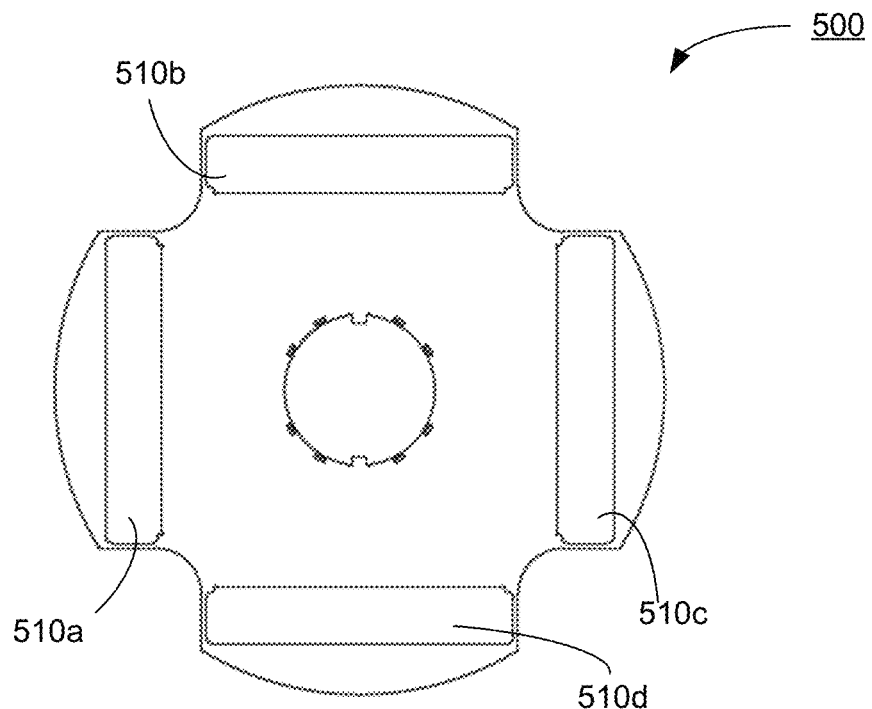
FIG. 5A illustrates a rotor of the generator, according to a embodiments of the present invention.
Figure 5B:
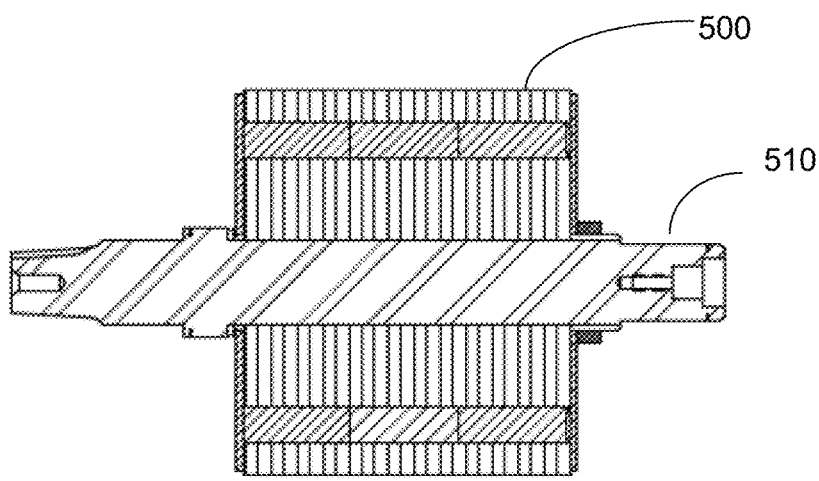
FIG. 5B illustrates the rotor of the generator connected to a shaft, according to a embodiments of the present invention.

FIG. 5A illustrates the rotor assembly 500 of the generator 120, according to an embodiment of the present invention. In some embodiments, the rotor assembly 500 comprises one or more laminated sheets made from the preselected steel and sets of permanent magnets. FIG. 5B illustrates the rotor assembly 500 of the generator 120 connected to a shaft, according to an embodiment of the present invention. The shaft 510 of the generator is connected to the engine 110 of FIG. 1 to drive the generator engine set to provide a frequency required by the predefined load. The permanent magnets 510a, 510b, 510c, and 510d placed in the rotor produce a rotating magnetic field within the generator 120 when connected to the shaft 510, where the rotating magnetic field cuts the coils present in the stator 600.

Figure 6A:
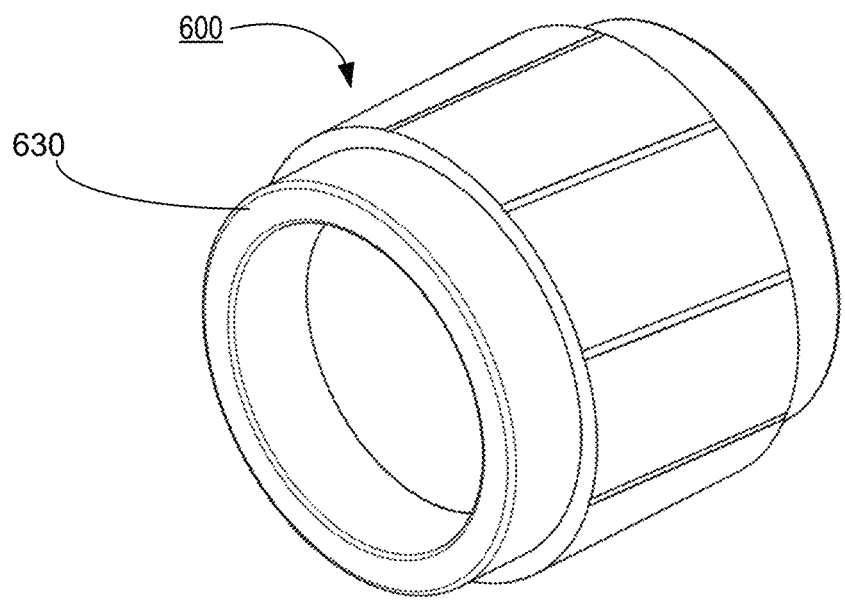
FIG. 6A illustrates a stator of the generator, according to embodiments of the present invention.
Figure 6B:
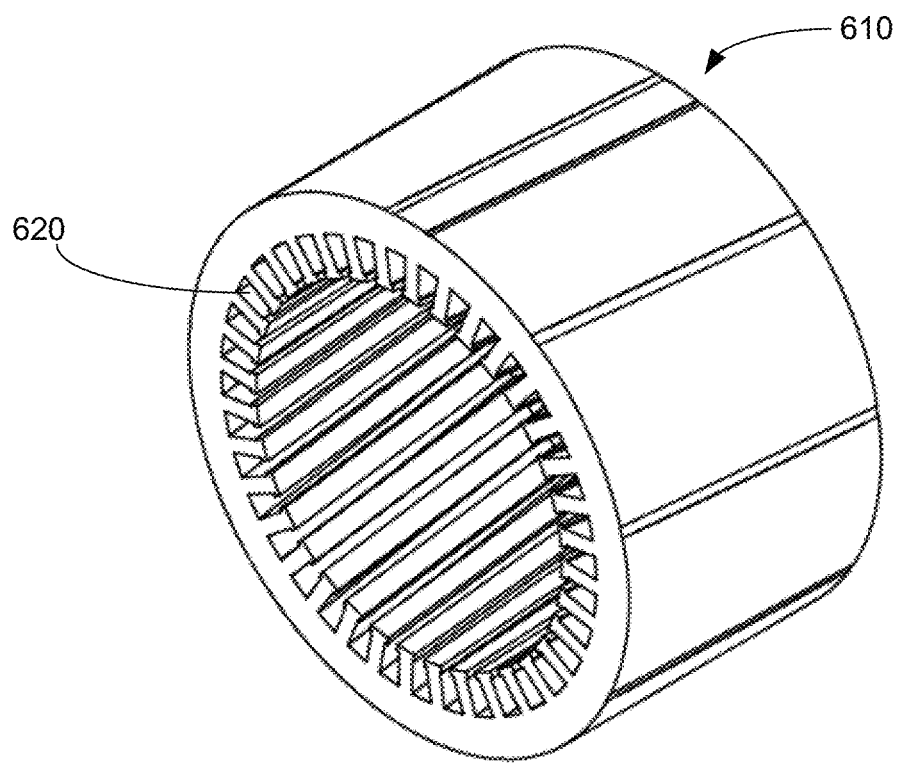
FIG. 6B illustrates a stator core of the generator, according to embodiments of the present invention.

FIG. 6A illustrates a stator 600 of the generator, according to an embodiment of the present invention. The stator 600 comprises a stator core 610 as illustrated in FIG. 6B, according to an embodiment of the present invention. The stator 600 comprises one or more stator coils 630 placed in one or more stator slots 620 of the stator core 610. In some embodiments, an optimum number of the one or more stator slots selected for the generator are 36 based on the generator size and inductance requirements associated with the predefined load. In some embodiments, the number of the one or more stator slots selected for the generator 120 may be lower or higher than 36. However, increase in the number of the one or more stator slots increases the losses of the generator for a given size of the generator. The stator core 630 comprises one or more laminated sheets made from the preselected steel. In some embodiments, the outside diameter of the stator is between 253 mm and 342 mm. In a preferred embodiment, the optimum outside diameter of the stator is 297.23 mm. In some embodiments, the length of the stator lamination stack is between 145 mm and 196 mm. In a preferred embodiment, the optimum length of the stator lamination stack is 170.66 mm. The relative apparent permeability induced in the preselected steel of the generator is dependent on the outside diameter of the stator 500, the length of the stator 500, the magnetic field produced by the permanent magnets 510a, 510b, 510c, and 510d and series turns per phase of the generator.

The generator 120 does not comprise any control or regulating mechanism to control the output of the generator, which reduces the overall size and cost of the generator 120. Instead, the generator 120 is designed such that the output voltage produced by the generator 120 meets the voltage requirements of the predefined load based on the magnetic field produced by the permanent magnets 510a, 510b, 510c, and 510d, magnetic characteristics of the preselected steel, the internal temperature of the generator which is in turn dependent on the ambient temperature, demagnetizing field resulting from the current drawn by the predefined load, size of the generator, number of series turns per phase in the generator, and inductance of the generator.

The magnetic field produced by the preselected permanent magnets 510a, 510b, 510c, and 510d of a predefined field strength causes the preselected steel to reach a level of saturation beyond the knee of the B-H curve. Once the level of saturation beyond the knee of the B-H curve is reached, even a significant change in the magnetic field strength does not cause a lot of change in the flux density of the preselected steel, thereby causing a very small change in the output voltage of the generator 120. After the preselected steel reaches the saturation region that is above the knee of the B-H curve, the demagnetizing field from the current drawn by the predefined load and the internal temperature of the generator 120 control the output voltage of the generator 120 to meet the voltage requirements of producing an output voltage that is above a transient required voltage to start the predefined load when at or above ambient temperature and to maintain the output voltage below a voltage upper limit when running with no load current at or below ambient temperatures.

Additionally, the size of the generator and the type of permanent magnets are interdependent on each other which have an effect on the output voltage of the generator. If the size of the generator selected is large, the amount of magnetic flux passing through the steel (i.e., flux density (B)) of the generator is greater, thereby not requiring a magnet with higher field strength (H). In some embodiments, the size of the generator is based on the application associated with the generator. For example, the size of the generator to be used in a truck may vary from that of a generator designed for a small trailer. In addition to this interdependency, inductance of the generator is interdependent on the number of series turns per phase of the generator. If the number of series turns per phase used in the generator is higher, the inductance of the generator is high and vice versa. The number of series turns per phase are selected such that the inductance of the generator is not too high, since higher inductance lowers the total magnetic flux within the magnetic circuit of the generator because of the demagnetizing field from the current drawn by the predefined load.

Selection of the grade type of the steel, a number of the plurality of stator slots, outside diameter of stator lamination to meet the voltage requirements of the load, length of the stator lamination stack to meet the voltage requirements of the load, a number of the plurality of permanent magnets for placing within the rotor, magnetic polarization associated with the plurality of permanent magnets, size of the generator, number of series turns per phase of the generator, and inductance of the generator have an effect on the output voltage of the generator. One or more of these selections are based on the requirements (e.g., voltage requirements, size requirements, cost requirements, efficiency requirements, power requirements, or the like) of the predefined load. As explained above, one or more of these selections may be interdependent on each other which drive the overall cost, size, and output of the generator.

Although the present invention discloses a generator that serves a refrigeration unit in a truck, tractor, trailer, semi-trailer, or the like, it should be understood that the generator described herein may be applicable for any loads that have similar voltage requirements at specific temperatures, cost requirements, size requirements, and/or efficiency requirements.

Figure 7:
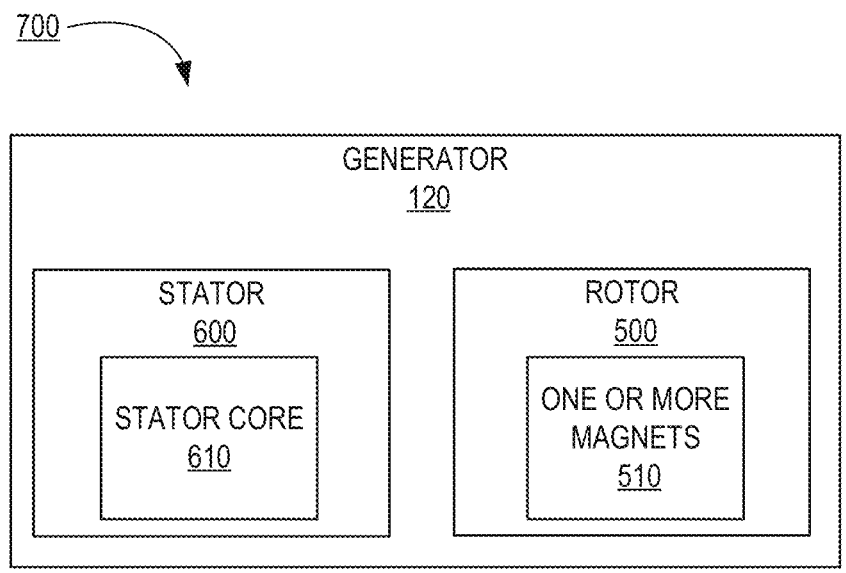
FIG. 7 illustrates a configuration of the generator of FIG. 1, according to embodiments of the present invention.

FIG. 7 illustrates a configuration of the generator of FIG. 1, according to an embodiment of the present invention. In a first preferred embodiment of the present invention, the generator 120 comprises a stator 600 comprising at least a stator core 610 with a plurality of stator slots and a plurality of stator coils. The stator core 610 comprises stator lamination stack that is made of steel. In the first preferred embodiment of the present invention, the generator 120 comprises a rotor further comprising (i) a rotor core, where the rotor core comprises a rotor lamination stack made of the steel, and (ii) a plurality of permanent magnets 510 for establishing a rotating magnetic field within the generator 120. The generator 120 according to the first preferred embodiment of the present invention is structured to meet a hot generator, high current, transient loaded minimum voltage working point requirement by maintaining relative apparent permeability of the steel below a first limit and to meet a cold generator, no load current working point maximum voltage limit requirement.

Figure 8:
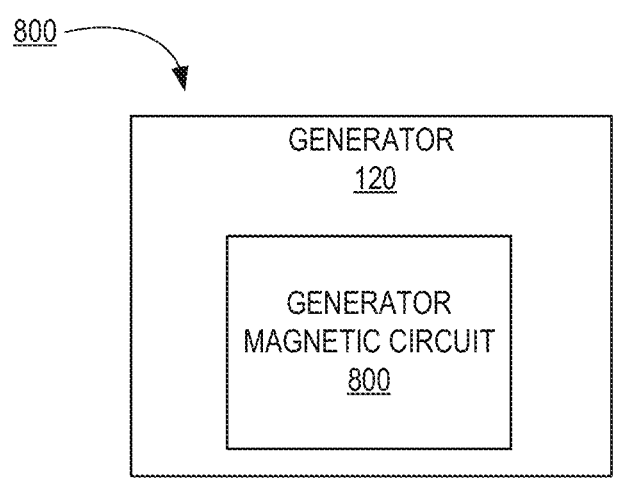
FIG. 8 illustrates a configuration of the generator of FIG. 1, according to embodiments of the present invention.

FIG. 8 illustrates a configuration of the generator of FIG. 1, according to an embodiment of the present invention. In a second preferred embodiment of the present invention, the generator 120 comprises a generator magnetic circuit 800, where the generator magnetic circuit comprises at least in part a preselected steel. The generator 120 according to the second preferred embodiment of the present invention is structured to meet a hot generator, high current, transient loaded minimum voltage working point requirement by maintaining relative apparent permeability of the steel below a first limit and to meet a cold generator, no load current working point maximum voltage limit requirement.

FIG. 9 illustrates a process flow 900 of constructing the generator of FIG. 1, according to an embodiment of the present invention. As shown in block 910 of the process flow 900, the method of constructing the generator comprises providing a stator comprising at least a stator core with a plurality of stator slots and a plurality of stator coils, wherein the stator core comprises a stator lamination stack made of steel. As shown in block 920 of the process flow 900, the method of constructing the generator comprises providing a rotor comprising (i) a rotor core, where the rotor core comprises a rotor lamination stack made of the steel, and (ii) a plurality of permanent magnets for establishing a rotating magnetic field within the generator. The generator constructed based on the process flow 900 meets a hot generator, high current, transient loaded minimum voltage working point requirement by maintaining relative apparent permeability of the steel below a first limit and meets a cold generator, no load current working point maximum voltage limit requirement.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. In addition, where possible, any terms expressed in the singular form herein are meant to also include the plural form and/or vice versa. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein.

What is claimed is:

1. A generator for connecting to a load, the generator comprising:
  a stator comprising at least a plurality of stator coils and a stator core with a plurality of stator slots, wherein the stator core comprises a stator lamination stack made of steel;
  a rotor comprising:
    a rotor core comprising a rotor lamination stack made of the steel; and
  a plurality of permanent magnets for establishing a rotating magnetic field within the generator;
  wherein the generator:
    meets a hot generator requirement comprising a high current, transient loaded minimum voltage working point by maintaining relative apparent permeability of the steel of the stator lamination stack below a first limit;
    meets a cold generator requirement comprising a no load current, working point maximum voltage limit; and
  wherein the first limit is 500.

2. The generator of claim 1, wherein the generator meets the cold generator limit requirement by maintaining the relative apparent permeability of the stator lamination stack above a second limit.

3. The generator of claim 2, wherein the second limit is 10.

4. The generator of claim 1, wherein the output voltage of the generator is dependent on, at least in part, the relative apparent permeability of the steel of the stator lamination stack, wherein the relative apparent permeability of the steel of the stator lamination stack at the hot generator requirement and the cold generator requirement is dependent on at least one selected from the group comprising (i) a grade type of the steel, (ii) magnetic polarization of the plurality of magnets, (iii) temperature of the generator, (iv) current drawn by the load, (v) size of the generator, (vi) number of series turns of the generator and (vi) inductance of the generator.

5. The generator of claim 1, wherein the plurality of stator slots is 36 or less and the plurality of permanent magnets are 4.

6. The generator of claim 1, wherein an outside diameter of the stator is between 253 mm and 342 mm.

7. The generator of claim 1, wherein a length of the stator lamination stack of the stator is between 145 mm and 196 mm.

8. The generator of claim 1, wherein the generator is connected to an induction motor load that drives a refrigeration unit to maintain a temperature at or below 6 degree Celsius.

9. A generator for connecting to a predefined load, the generator comprising:
  a generator magnetic circuit, wherein the generator magnetic circuit comprises at least in part a steel that is preselected;
  wherein the generator:
    meets a hot generator requirement comprising a high current, transient loaded, minimum voltage point by maintaining relative apparent permeability of the steel of the generator magnetic circuit below a first limit; and
    meets a cold generator requirement comprising a no load current, working point maximum voltage limit; and
  wherein the first limit is 500.

10. The generator of claim 9, wherein the generator magnetic circuit further comprises a stator comprising at least a plurality of stator coils and a stator core with a plurality of stator slots, wherein the stator core comprises a stator lamination stack made of steel and wherein the generator meets the hot generator requirement by maintaining the relative apparent permeability of the steel of the stator lamination stack below the first limit.

11. The generator of claim 10, wherein outside diameter of the stator is between 253 mm and 342 mm.

12. The generator of claim 10, wherein length of stator lamination stack is between 145 mm and 196 mm.

13. The generator of claim 10, wherein the plurality of stator slots is 36 or less.

14. The generator of claim 9, wherein the generator magnetic circuit further comprises a rotor comprising (i) a rotor core comprising a rotor lamination stack made of the steel and (ii) a plurality of permanent magnets for establishing a rotating magnetic field within the generator, where a core of the rotor is made of the steel.

15. The generator of claim 14, wherein the output voltage of the generator is dependent on, at least in part, the relative apparent permeability of the steel of the generator magnetic circuit, wherein the relative apparent permeability of the steel is dependent at least one selected from the group comprising (i) a grade type of the steel, (ii) magnetic polarization of the plurality of magnets, (iii) temperature of the generator, (iv) current drawn by the load, (v) size of the generator, (vi) number of series turns of the generator and (vi) inductance of the generator.

16. The generator of claim 14, wherein the plurality of permanent magnets is 4.

17. A permanent magnet generator for a preselected load, wherein the permanent magnet generator comprises a generator magnetic circuit, wherein the generator magnetic circuit comprises, at least in part, a steel that is preselected;
wherein the permanent magnet generator:
  meets a hot generator requirement comprising a high current, transient loaded, minimum voltage point by maintaining relative apparent permeability of the steel of the generator magnetic circuit below a first limit; and
  meets a cold generator requirement comprising a no load current, working point maximum voltage limit; and
wherein the first limit is 500.

18. A method of constructing a generator for connecting to a load, wherein the method comprises:
  providing a stator comprising at least a plurality of stator coils and a stator core with a plurality of stator slots, wherein the stator core comprises a stator lamination stack made of steel;
  providing a rotor comprising:
    a rotor core comprising a rotor lamination stack made of the steel; and
    a plurality of permanent magnets for establishing a rotating magnetic field within the generator;
  wherein the generator:
    meets a hot generator requirement comprising a high current, transient loaded, minimum voltage point and by maintaining relative apparent permeability of the steel of the stator lamination stack below a first limit; and
    meets a cold generator requirement comprising a no load current, working point maximum voltage limit; and
wherein the first limit is 500.

19. The method of claim 18, further comprising:
(i) wherein the step of providing a stator comprises:
  selecting a grade type of the steel, with a saturation flux density for the stator lamination stack of the stator to meet voltage requirements of the load;
  selecting a number of the plurality of stator slots to meet the voltage requirements of the load;
  selecting an outside diameter of stator lamination to meet the voltage requirements of the load; and
  selecting a length of the stator lamination stack to meet the voltage requirements of the load;
(ii) wherein the step of providing a rotor comprises:
  selecting a number of the plurality of permanent magnets for placing within the rotor to meet a frequency requirement of the load; and
  selecting magnetic polarization for the plurality of permanent magnets to provide the rotating magnetic field within the generator to meet a voltage requirement of the load;
and selecting size of the generator;
(iii) wherein the method further comprises:
  selecting number of series turns per phase of the generator; and
  selecting an inductance of the generator; and
(iv) wherein the output of the generator is regulated by at least one selected from the group comprising (a) the saturation flux density of the grade type of the steel, (b) the number of the plurality of slots, (c) the outside diameter of the stator lamination, (d) the length of the stator lamination stack, (e) the magnetic polarization of the permanent magnets, (f) temperature of the generator, (g) current drawn by the load, (h) the size of the generator, (i) the number of series turns per phase of the generator, and (j) the inductance of the generator.

20. The method of claim 19, wherein the number of the plurality of slots is 36 or less.

21. The method of claim 19, wherein the number of the permanent magnets is 4.

22. The method of claim 19, wherein the outside diameter of the stator is between 253 mm and 342 mm.

23. The method of claim 19, wherein the length of the stator lamination stack is between 145 mm and 196 mm.

24. The method of claim 18, wherein the load is an induction motor that drives a refrigeration unit to maintain a temperature at or below 6 degree Celsius.

25. The method of claim 18, wherein the generator meets the cold generator requirement by maintaining the relative apparent permeability above a second limit.

26. The method of claim 25, wherein the second limit is 10.

* * * * *